US010613952B2

(12) United States Patent
Gregg et al.

(10) Patent No.: US 10,613,952 B2
(45) Date of Patent: Apr. 7, 2020

(54) MULTI-PORT COMMUNICATIONS SWITCH WITH AUTOMATED FLIP EMULATION

(71) Applicant: Acroname, Inc., Boulder, CO (US)

(72) Inventors: Justin Lawrence Gregg, Golden, CO (US); Matthew Joseph Krugman, Boulder, CO (US); Lance Chapin Davies, Loveland, CO (US); Jeremiah Reece Sullenger, Lafayette, CO (US)

(73) Assignee: Acroname, Inc., Boulder, CO (US)

( * ) Notice: Subject to any disclaimer, the term of this patent is extended or adjusted under 35 U.S.C. 154(b) by 330 days.

(21) Appl. No.: 15/851,193

(22) Filed: Dec. 21, 2017

(65) Prior Publication Data

US 2019/0196924 A1 Jun. 27, 2019

(51) Int. Cl.
| | |
|---|---|
| *G06F 11/22* | (2006.01) |
| *H01R 13/64* | (2006.01) |
| *G06F 13/38* | (2006.01) |
| *G06F 13/10* | (2006.01) |
| *G06F 13/42* | (2006.01) |
| *G06F 13/40* | (2006.01) |

(52) U.S. Cl.
CPC .......... *G06F 11/221* (2013.01); *G06F 13/105* (2013.01); *G06F 13/385* (2013.01); *G06F 13/4068* (2013.01); *G06F 13/4295* (2013.01); *H01R 13/64* (2013.01); *G06F 2213/0042* (2013.01)

(58) Field of Classification Search
CPC .......... G06F 11/221; G06F 2213/0042; G06F 13/105; G06F 13/385; G06F 13/4068; G06F 13/4295; H01R 13/64

USPC ...... 324/500, 520–524, 750.01, 750.16, 600, 324/612, 616, 629, 638–650, 76.11, 216
See application file for complete search history.

(56) References Cited

U.S. PATENT DOCUMENTS

2004/0107393 A1* 6/2004 Taucher ........... G01R 31/31835
714/724
2014/0298125 A1* 10/2014 Devadze ................ G06F 11/26
714/726

* cited by examiner

*Primary Examiner* — Melissa J Koval
*Assistant Examiner* — Trung Nguyen
(74) *Attorney, Agent, or Firm* — Snell & Wilmer LLP (57) ABSTRACT

Embodiments provide multi-port communications switches with automated flip emulation for multi-orientation data connectors, for example, to test data connector system components. One embodiment includes multiple ports, each with pins adapted to electrically couple with corresponding structures of a data connector when the connector is physically coupled with the port in any of multiple connector orientations. A flip controller couples pins of first and second ports in accordance with a selected configuration, such that: in a first mode, the flip controller effectively emulates the coupled ports being in a same connector orientation; and in a second mode, the flip controller effectively emulates the coupled ports being in different orientations (e.g., as if one of the connectors is flipped over). Some implementations include additional features, such as selective switching between multiple ports, interfacing with external computational controllers, keep-alive charging of idle devices, measurement of electrical characteristics, and data channel processing.

20 Claims, 8 Drawing Sheets

MULTI-PORT COMMUNICATIONS SWITCH WITH AUTOMATED FLIP EMULATION

FIELD

Embodiments relate generally to communications switches, and, more particularly, to multi-port communications switches having automated flip emulation for multi-orientation data connectors.

BACKGROUND

Conventional data connectors have tended to have single-orientation interfaces. For example, Universal Serial Bus (USB) Type A and B connectors, High-Definition Multimedia Interface (HDMI) connectors, and other data such data connectors have traditionally been designed to plug into a corresponding port in one orientation; if the cable is flipped over, it will not physically fit into the port. In recent years, multiple connector systems (including corresponding standards, protocols, etc.) have been designed to interface with their respective ports in multiple orientations. For example, USB Type C connectors and Lightning connectors support rotational symmetry, so that the cables can be plugged into corresponding ports in at least two orientations (e.g., if such a connector is flipped over, it can still be plugged in).

Testing such connectors and/or ports can be cumbersome, time consuming, prone to error, and/or otherwise undesirable. For example, a laptop may include multiple USB Type C ports, and it may be desirable to test each port with a reference device (e.g., a removable storage device, charger, signal generator, etc.) in each of the multiple permitted orientations. Similarly, it may be desirable to test a single USB Type C port on a laptop with multiple types of reference devices in each of the multiple permitted orientations. Such a test can typically involve a human or robot plugging each of the one or more reference devices into each of the one or more USB Type C ports in each of at least two orientations.

BRIEF SUMMARY

Among other things, systems and methods are described for providing multi-port communications switches having automated flip emulation for multi-orientation (e.g., rotationally symmetric) data connectors. For example, embodiments can be used to test ports, connectors, cables, and/or other data connector system components in a manner that emulates flipping connector orientations and/or switching among multiple ports. One embodiment includes multiple ports, each with pins adapted to electrically couple with corresponding structures of a data connector when the connector is physically coupled with the port in any of multiple connector orientations. A flip controller couples pins of a first port with pins of a second port in accordance with a selected configuration, such that: in a first mode, the flip controller effectively emulates the coupled ports being in a same connector orientation; and in a second mode, the flip controller effectively emulates the coupled ports being in different orientations (e.g., as if one of the connectors is flipped over). Some implementations include additional features, such as selective switching between multiple ports, interfacing with external computational controllers, keep-alive charging of idle devices, measurement of electrical characteristics, data channel processing, etc.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention can be practiced without these specific details. In some instances, circuits, structures, and techniques have not been shown in detail to avoid obscuring the present invention.

Figure 1:
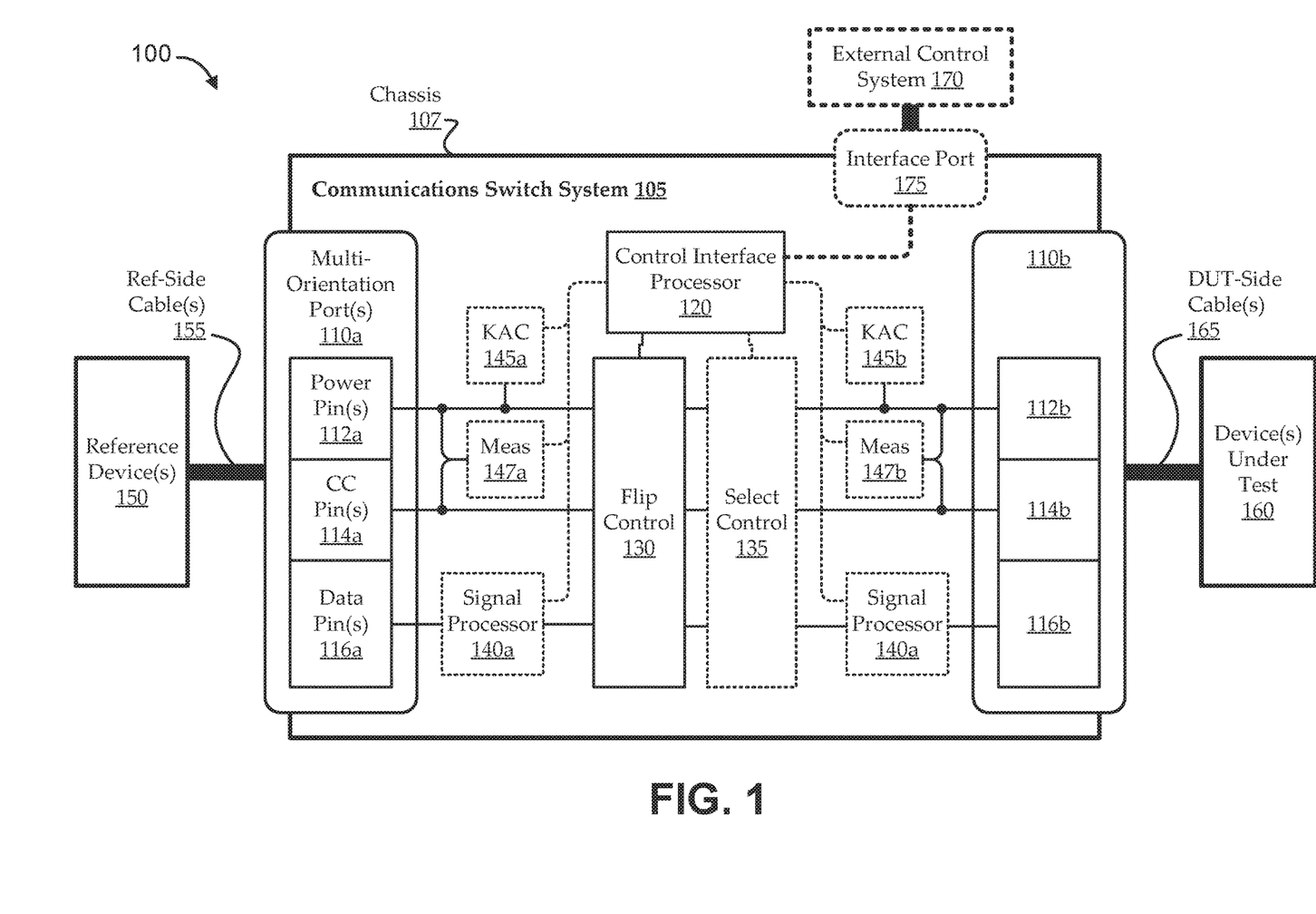
FIG. 1 shows an illustrative multi-port communications switch environment, according to various embodiments.

FIG. 1 shows an illustrative multi-port communications switch environment 100, according to various embodiments. The environment 100 includes a communications switch system 105 coupled between one or more reference devices 150 and one or more devices under test 160. Embodiments of the communications switch system 105 include a control interface processor 120 and a flip controller 130. In some embodiments, the communications switch system 105 includes additional components, such as one or more select controllers 135, one or more keep-alive charging circuits 145, one or more measuring circuits 147, and one or more signal processors 140. Some implementations of the communications switch system 105 include a chassis 107 that houses some or all of the components. Some embodiments of the communications switch system 105 can also include one or more interface ports 175 to interface with one or more external control systems 170, such as an external computer, testing control hardware, etc.

Embodiments of the communications switch system 105 can be used for testing ports, connectors, and/or other multi-orientation data connector system components in a manner that includes novel techniques for emulating changes in cable orientation (e.g., cable flips). Recent developments in data connector systems have yielded implementations that support connection in multiple orientations. For example, a Universal Serial Bus (USB) Type C connector can be designed in a rotationally symmetric form factor to support plugging the connector into a corresponding receptacle in either of two rotational orientations. From the user's perspective, the connector appears orientation agnostic. However, to implement the orientation-agnostic functionality, the USB Type C connection system components include particular features for detecting and communicating orientation. For example, a typical USB Type C cable can include circuitry that specifies the orientation of its connector (e.g., typically a male plug) when plugged into a mating port, and the mating port (e.g., typically a female receptacle) can include circuitry to detect the specified orientation. As such, from a connection system perspective, functionality of the cable may not be completely agnostic to orientation; and the connector can potentially operate differently and/or more effectively in a particular one of its permitted orientations. Accordingly, when testing the operation of such a port or connector, it can be desirable to test all permitted orientations to ensure orientation-agnostic operation from a user perspective.

Embodiments of the communications switch system 105 enable such testing without relying on physically connecting and disconnecting interfaces in their multiple permitted orientations. As a first example, the communications switch system 105 is used to test N USB Type C interfaces of a device under test 160 (e.g., USB ports of a laptop, multi-port hub, etc.) against a single USB Type C reference device 150 (e.g., a USB memory stick, USB charger, etc.). As a second example, the communications switch system 105 is used to test N USB Type C reference devices 150 against a single USB Type C interface of a device under test 160. Conventionally, full testing of the ports in either example would involve manually and sequentially connecting and disconnecting (e.g., plugging and unplugging) the each of N interfaces in each of two orientations. Such a conventional approach can lead to damage of the interfaces (e.g., by rapid and repeated plugging and unplugging), unreliable testing (e.g., by incentivizing the human tester simply to pass all devices, or otherwise fabricate results), and/or other concerns. Using the communications switch system 105, all one or more interfaces of the device(s) under test 160 and all one or more reference devices 150 can be connected to the communications switch system 105 at one time, and the communications switch system 105 can automatically perform any desired changes in interface orientation and/or selection (e.g., switching, routing, etc.) without physical manipulation by an operator.

The communications switch system 105 includes one or more first multi-orientation ports 110a and one or more second multi-orientation ports 110b. As used herein, terms, such as "multi-orientation" (and "orientation agnostic," and the like) are intended broadly to describe physical characteristics of a connector system component, including any connector system approaches designed to enable physical interfacing of connectors with ports in two or more orientations (e.g., as with USB Type C and Lightning connector systems, as described above). Other connector system designs may support additional orientations, such as a connector with a square cross-section that supports four orientations. Even if there are orientation-specific differences in electrical functionality, pin configurations, and/or the like, the connector is still considered herein to be multi-orientation or orientation-agnostic.

Each multi-orientation port 110 can include multiple pins. Each "pin" can include one or more conductive structures. As illustrated, the pins can include a set of (i.e., one or more) power pins 112, a set of configuration channel pins 114, and a set of data pins 116. In some implementations, each multi-orientation port 110 is a USB Type C port that includes a power pin 112 (e.g., a "Vbus" pin), two configuration channel pins 114 (e.g., a "CC1" pin and a "CC2" pin), and eight data pins 116 (e.g., two sideband unit (SBU) pins, four high-speed (HS) data pins, and eight super-speed (SS) data pins). The term "pin" is intended herein to include one or more suitable signal coupling structures, such as any suitable raised or recessed conductive structures for input and/or output of power, configuration, and/or data-related signals. Though embodiments are described herein with reference to plugging connectors into ports, and the like, such structures (e.g., terms, like "port," "connector," "connector system component," etc.) are intended generally to include any interface that provides both physical and electrical interfacing between devices. For example, a connector can include a male plug, a female receptacle, or other suitable structure implemented at an end of a cable, as part of a removable peripheral device (e.g., a thumb drive), etc. Similarly, the connector can interface any suitable port, such as including a male plug, a female receptacle, or other suitable structure implemented at an end of a cable (e.g., a captive or removable cable), as part of a device under test 160, as part of a reference device 150, as part of a switch or hub (e.g., communications switch system 105), etc. Accordingly, as used herein, a connector can be said to be "plugged into" a port, or the like, regardless of whether the connector includes a male plug, female receptacle, magnetic interface, etc.

As illustrated, one or more first ports 110a can be coupled with one or more second ports 110b via components of the communications switch system 105. Reference to "first" and "second" ports 110 is intended for added clarity and not to limit particular embodiments. In some implementations, the first and second ports 110 are physically and functionally identical. For example, the ports 110 are all of the same type, and the communications switch system 105 is implemented in a functionally symmetric manner (e.g., any port 110 can be used for interfacing with a reference device 150 or a device under test 160, etc.), and particular functionality of each port 110 can be identified manually (e.g., by a switch), automatically (e.g., by the control interface processor 120), or in any other suitable manner. In other implementations, the ports 110 are physically and electrically identical, but the first ports 110a and the second ports 110b differ in their functional relationship to other components of the communications switch system 105. For example, second ports 110b can be selectively actuated, while first ports 110a cannot; first ports 110a are only for devices under test 160, while second ports 110b are only for reference devices 150; etc. In still other implementations, some or all of the first ports 110a are electrically and/or physically different from some or all of the second ports 110b.

As illustrated, pins of the first port(s) 110a can be coupled with pins of the second port(s) 110b via the flip controller 130. Embodiments of the flip controller 130 emulate a physical change in coupling orientation at one or more of the ports 110. The flip controller 130 can include multiple first-side connections coupled with the pins of the first port(s) 110a and second-side connections coupled with the pins of the second port(s) 110b. The flip controller 130 can selectively couple first-side connections with second-side connections according to a selected flip mode. In some embodiments, the flip controller 130 includes a flip control input coupled with a flip control output of the control interface processor 120. When the control interface processor 120 directs the flip controller 130 to be in a first flip mode, the flip controller 130 can couple the first-side connections with the second-side connections to emulate the first port(s) 110a and the second port(s) 110b being oriented according to a same connector orientation (e.g., no flip). When the control interface processor 120 directs the flip controller 130 to be in a second flip mode, the flip controller 130 couples the first-side connections with the second-side connections to emulate the first port(s) 110a and the second port(s) 110b being oriented according to different connector orientations (e.g., emulating a physical flipping of one of the ports 110).

Figure 2A:
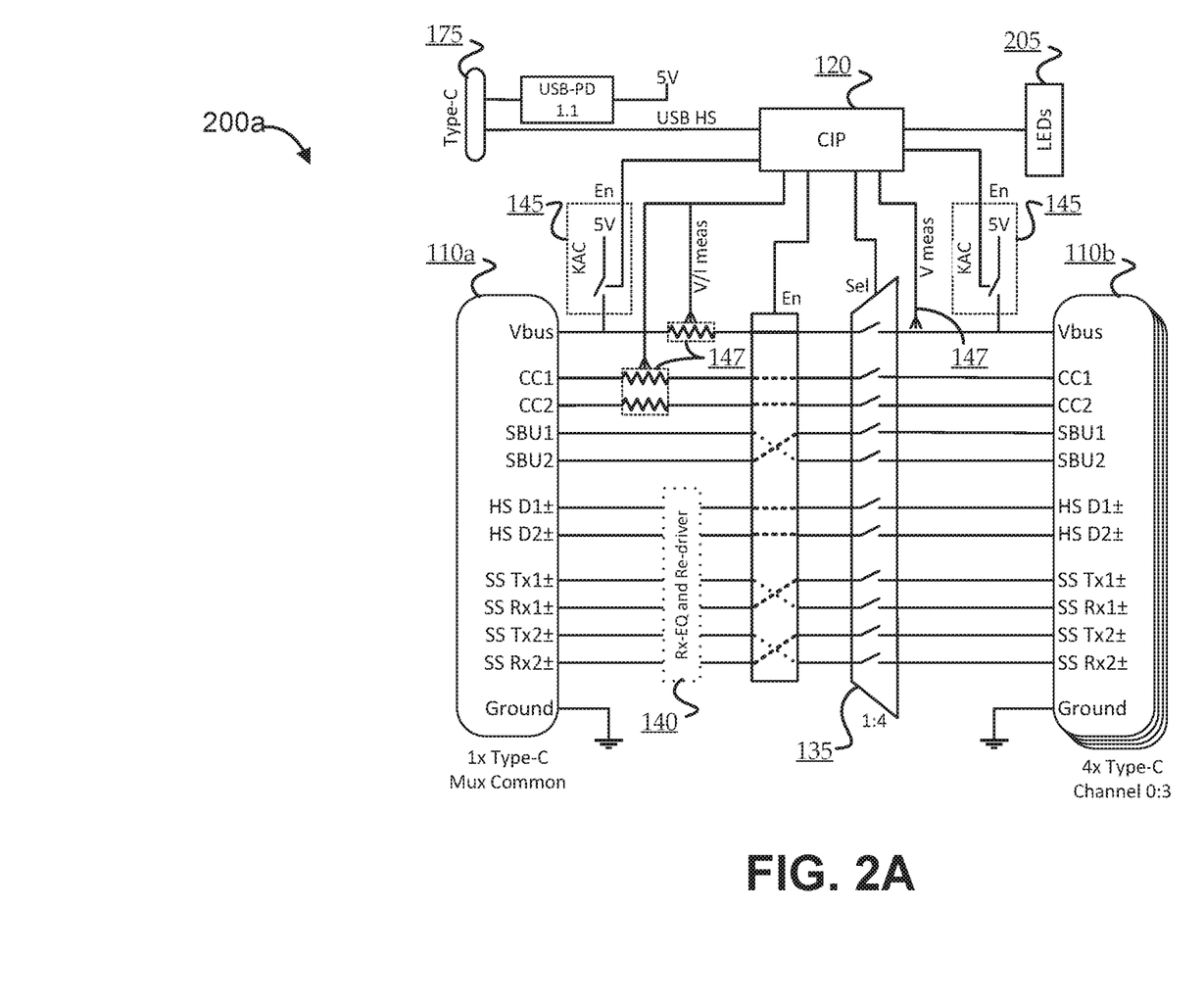
FIGS. 2A and 2B show an illustrative implementation of a communications switch system operating in first and second flip modes, respectively, according to various embodiments.
Figure 2B:
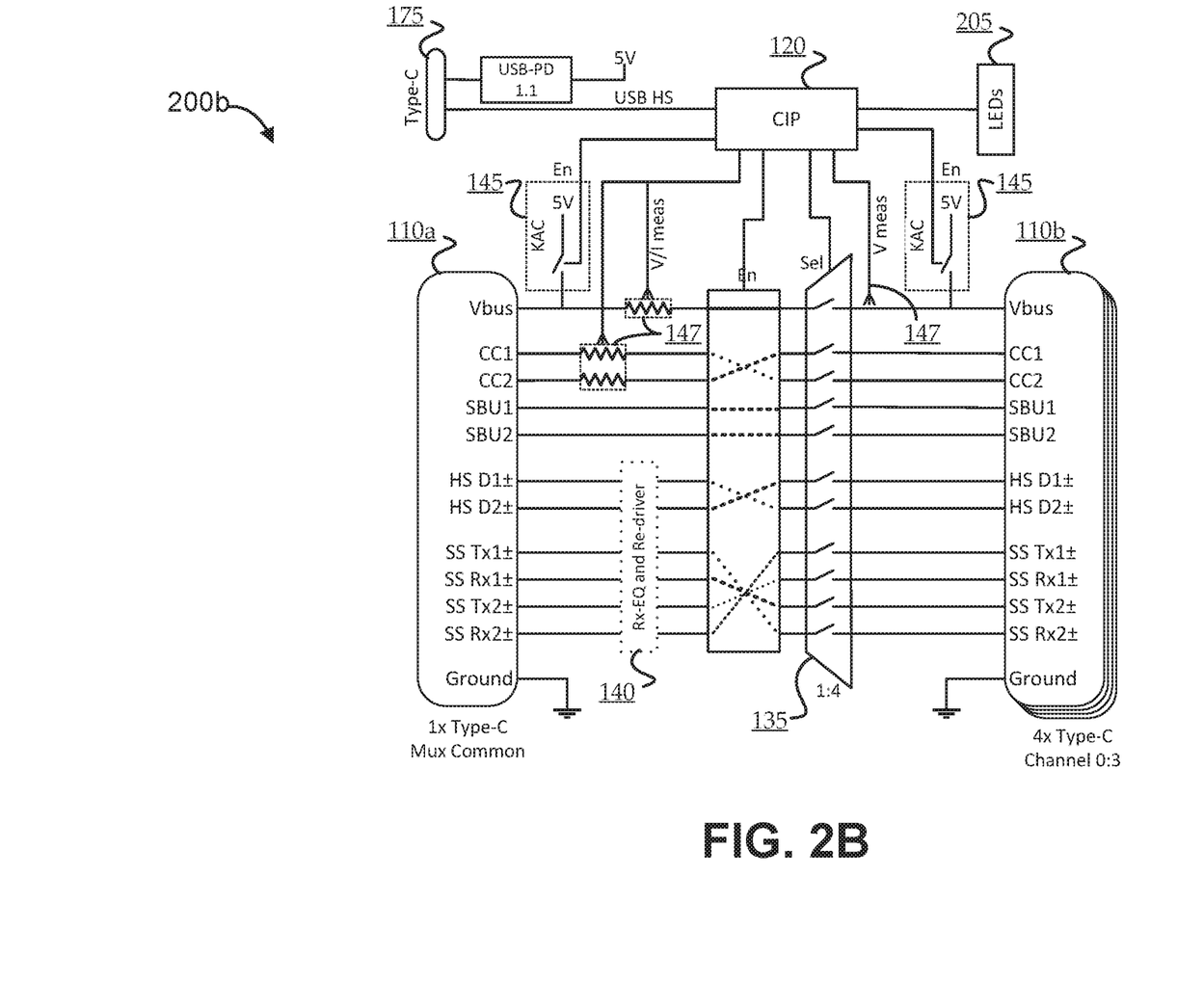

For the sake of illustration, FIGS. 2A and 2B show an illustrative implementation of a communications switch system 200 operating in first and second flip modes, respectively, according to various embodiments. The communications switch system 200 can be an implementation of the communications switch system 105 of FIG. 1. The illustrative communications switch system 200 has a single first port 110a and four second ports 110b. Each port is designed according to the USB Type C specification, such that each includes seventeen pins: a power pin (Vbus), a first control channel (CC1) pin, a second control panel (CC2) pin, a first sideband unit (SBU1) pin, a second sideband unit (SBU2) pin, a first high-speed data positive (HS D1+) pin, a second high-speed data positive (HS D2+) pin, a first high-speed data negative (HS D1−) pin, a second high-speed data negative (HS D2−) pin, a first super-speed data channel transmit positive (SS Tx1+) pin, a first super-speed data channel receive positive (SS Rx1+) pin, a second super-speed data channel transmit positive (SS Tx2+) pin, a second super-speed data channel receive positive (SS Rx2+) pin, a first super-speed data channel transmit negative (SS Tx1−) pin, a first super-speed data channel receive negative (SS Rx1−) pin, a second super-speed data channel transmit negative (SS Tx2−) pin, and a second super-speed data channel receive negative (SS Rx2−) pin. A ground pin is also shown, which can be implemented in any suitable manner, which can be directly coupled between 110a, 110b, and 175.

In FIG. 2A, a first flip mode is illustrated that effectively emulates no change in orientation over the communications switch system 200a. For example, the communications switch system 200a can effectively act as a repeater, or extension cable to a device connected to 110a or 110b. As per the USB Type C specification, in the first flip mode, power signals, control channel signals, and high-speed data channel signals can be passed through (i.e., the Vbus, CC1, CC2, HS D1+/−("+/−" indicating a differential pair), and HS D2+/− pins of the first port 110a are effectively coupled with the Vbus, CC1, CC2, HS D1+/−, and HS D2+/− pins of second port(s) 110b, respectively, through the communications switch system 200a); and the sideband unit and super-speed data channel signals are cross-coupled between respective transmit and receive pins of the ports 110 (i.e., the SBU1, SBU2, SS Tx1+/−, SS Rx1+/−, SS Tx2+/−, and SS Rx2+/− pins of the first port 110a are coupled with the SBU2, SBU1, SS Rx1+/−, SS Tx1+/−, SS Rx2+/−, and SS Tx2+/− pins of second port(s) 110b, respectively, through the communications switch system 200a).

In FIG. 2B, a second flip mode is illustrated that effectively emulates a flipping in orientation over the communications switch system 200a. For example, the communications switch system 200b can effectively act as if a cable coupled with either the first port 110a or one of the second ports 110b was unplugged, flipped over, and plugged back in. In the second flip mode, the power signals continue to be passed through (i.e., the Vbus pin of the first port 110a is effectively coupled with the Vbus pin of the second port(s) 110b through the communications switch system 200b); but all other pins are rerouted to emulate the change in orientation (i.e., the CC1, CC2, SBU1, SBU2, HS D1+/−, HS D2+/−, SS Tx1+/−, SS Rx1+/−, SS Tx2+/−, and SS Rx2+/− pins of the first port 110a are coupled with the CC2, CC1, SBU1, SBU2, HS D2+/−, HS D1+/−, SS Rx2+/−, SS Tx2+/−, SS Rx1+/−, and SS Tx1+/− pins of second port(s) 110b, respectively, through the communications switch system 200b).

Notably, the two flip modes illustrated in FIGS. 2A and 2B are intended only to be illustrative, and any other desired flip modes can be included for testing particular types of signal routing cases, particular failure modes, different interface specifications, and/or the like. In various alternative flip modes, individual pins or sets of pins can be selectively flipped. For example, one flip mode can flip only the CC pins, and another flip mode can flip only the SBU pins. Further, "mode" is intended herein to refer to any suitable types of configuration setting. For example, switching from a first mode to a second mode can involve toggling a switch or selector, changing one or more bit values in a signal, etc. In some implementations, changing modes can involve multiple steps performed in series or in parallel. For example, embodiments are described as involving a flip control output to indicate a selected one of multiple flip modes. In some such embodiments, the flip control output can indicate a first selected flip mode according to the pins being in one configuration, and the flip control output can indicate a second selected flip mode according to multiple pins, or sets of pins, having been flipped sequentially over multiple steps.

Returning to FIG. 1, some embodiments of the communications switch system 105 operate in context of one or more universal orientation cables (UOCs). Depending on how the communications switch system 105 is being used (e.g., as described in context of FIGS. 3-5 below), a UOC can be used as one or more of the reference-side cables 155 coupling the communications switch system 105 with one or more reference devices 150, and/or as one or more of the DUT-side cables 165 coupling the communications switch system 105 with one or more devices under test 160 (e.g., or one or more ports of a device under test 160). As described above, some multi-orientation cable systems are implemented in such a way that the cable or connector detects its orientation and logically communicates the orientation to an interface. For example, a USB Type C cable, when plugged into a USB Type C port, can detect its orientation and communicate its orientation to the port. As such, any emulated change of the orientation by the flip controller 130 may be ineffective. Embodiments of the UOC can effectively mimic a particular type of multi-orientation cable (e.g., including the various channels and pins corresponding to a particular multi-orientation connector system, the connector form factor, etc.), but without orientation-defining components. When the UOC is plugged into the communications switch system 105 and another device (e.g., a reference device 150 or a device under test 160), the cable does not define or communicate any orientation to the communications switch system 105 or to another device at its other end. Accordingly, the UOC can act as an orientation pass-through, so that emulating a port orientation adjustment by the flip controller 130 at the communications switch system 105 can appear as a port orientation adjustment at the device coupled on the other side of the cable (e.g., the reference device 150 or the device under test 160). Some embodiments are implemented as a kit including the communications switch system 105 and at least one UOC. In other embodiments, the UOC may be integrative as a captive, non-removable cable or other non-removal port or plug interface.

Various embodiments of the communications switch system 105 include additional components. Some embodiments include a select controller 135. The embodiments of FIG. 1 shows the select controller 135 implemented separately from, and on one side of, the flip controller 130. In other implementations, the select controller 135 can be one the other side of the flip controller 130, select controllers 135 can be implemented on both sides of the flip controller 130, or the select controller 135 can be integrated with the flip controller 130 (e.g., implemented as a single integrated circuit). As illustrated, embodiments of the select controller 135 can be coupled with the control interface processor 120, such that the control interface processor 120 can direct the select controller 135 as to which first port(s) 110a to couple with which second port(s) 110b at any particular time. For example, the select controller 135 can include a select control input coupled with a select control output of the control interface processor 120 by which to receive a signal directing the select controller 135 to select particular first and/or second ports 110.

Some embodiments of the select controller 135 include one or more multiplexers to select which of the first port(s) 110a is coupled with which of the second port(s) 110b. For example, the select controller 135 can include flip-side connections coupled with the second-side connections of the flip controller 130; N sets of port-side connections, each coupled with the pins of a respective one of N second ports 110b (e.g., where N is an integer greater than 1); and a select controller that can selectively couple the flip-side connections to any selected set of port-side connections. As an extension of the example, two such select controllers 135 can be coupled on either side of the flip controller 130 to enable selective coupling between M first ports 110a and the N second ports 110b. In such an implementation, the second select controller can include second flip-side connections coupled with the plurality of first-side connections of the flip controller; M second sets of port-side connections, each coupled with the pins of a respective one of the M first ports 110a; and a second selector circuit (e.g., implemented separately, or as a single selector circuit shared between the multiple select controllers 135) to selectively couple the second flip-side connections to any selected second set of port-side connections.

The select controller 135 effectively provides pathways (e.g., channels, signal paths, etc.) by which signals can be communicated between the ports 110. In some embodiments, the select controller 135 further includes selective actuators to selectively interrupt some or all of those pathways. For example, each path from a flip-side connection to a corresponding port-side connection can include a switch that can permit, or interrupt, respective signal flow. In some embodiments, the selective actuators are controlled automatically by signaling received from the control interface processor 120. Such selective actuation can facilitate execution of complex testing protocols that selectively introduce and/or remove certain signal paths. For example, such protocols can enable testing of how a particular device would function if a subset of its signals were malfunctioning, simulated testing of devices or connectors that interface with only a subset of the port 110 pins, etc. In some implementations, the selective actuators of the select controller 135 can additionally or alternatively couple one or more of the signal paths with an alternative stimulation path.

For example, while a particular reference device 150 is coupled with a particular device under test 160 through the communications switch system 105, the select controller 135 can be used to introduce spurious signals (e.g., noise, etc.) into one or more signal paths.

Embodiments of the communications switch system 105 effectively form signal pathways between devices interfacing (e.g., plugged into) the first port(s) 110a and devices interfacing with the second port(s) 110b. In some embodiments, the formed pathways are passive. For example, a data channel signal can be received via a pin of a first port 110a, can traverse corresponding connections and electronics of the flip controller 130 and the select controller 135, and can be transmitted via a corresponding pin of a second port 110b. Notably, however, as a signal passes through the communications switch system 105, the signal can experience certain types of distortion, such as noise, loss of gain at some or all frequencies, etc. Some embodiments of the communications switch system 105 can include one or more signal processors 140 to help mitigate such distortive effects. In some such embodiments, the signal processor(s) 140 include amplification and/or equalization components to add gain and/or equalization to some or all signal paths (e.g., only to data paths, etc.). In other such embodiments, the signal processor(s) 140 can break one or more of the signal paths to apply more complex processing using analog and/or digital signal processing components. For example, components can apply various types of filtering (e.g., band-pass filtering), re-timing, etc.

Some embodiments of the communications switch system 105 include one or more keep-alive charging circuits 145 and/or one or more measurement circuits 147. In some cases, one or more devices (reference devices 150 and/or devices under test 160) are plugged into, or otherwise interfaced with, the communications switch system 105, but are not presently participating in testing. For example, a device is plugged into a port 110 of the communications switch system 105, but the port 110 is currently deselected by the select controller 135. In such cases, it may be desirable to leave the device powered-on and operational (e.g., so it will be available to participate in the testing when selected), but leaving the powered-on can eventually consume its battery power. Accordingly, the keep-alive charging circuits 145 can be used to source power to devices (e.g., idle devices) to help avoid those devices running out of power during execution of a testing protocol.

Some embodiments of the communications switch system 105 include one or more measurement circuits 147 to measure electrical characteristics of some or all of the signal paths. Implementations of the measurement circuits 147 can, for example, measure voltage and/or current on power signals associated with the power pins 112 and/or on configuration channel signals associated with the configuration channel pins 114. Some implementations can additionally or alternatively measure voltage and/or current on one or more of the data channels associated with some or all of the data channel pins 116. Some implementations can additionally or alternatively monitor and record data on the configuration channel signals associated with the configuration channel pins 114. Embodiments of the signal processor(s) 140, keep-alive charging circuit(s) 145, and/or measurement circuit(s) 147 can be disposed on either or both sides of the flip controller 130. Further, embodiments of the signal processor(s) 140, keep-alive charging circuit(s) 145, and/or measurement circuit(s) 147 can be responsive to (and/or can communicate information to) the control interface processor 120.

As described above, some or all components of the communications switch system 105 can be responsive to control signals from the control interface processor 120. The control interface processor 120 can be implemented as a state machine, as a general purpose processor, as a dedicated processor, or in any other suitable manner. Further, though illustrated as separate components, one or more of the components of the communications switch system 105 can be integrated with the control interface processor 120, for example, as part of an integrated circuit, as separate circuits on a single circuit board, etc. Some embodiments of the control interface processor 120 operate independently (i.e., automatically). Some such embodiments include, or are in communication with memory, having stored thereon, instructions for executing a predefined (e.g., pre-programmed, selected, etc.) testing protocol. For example, the predefined testing protocol can include a series of defined stages in which particular first port(s) 110a and/or second port(s) 110b are selected by directing the select controller 135; in which orientations of particular first port(s) 110a and/or second port(s) 110b are virtually changed (e.g., flipped) by directing the flip controller 130; in which various signals are processed by interaction with the signal processor(s) 140 and/or measured by interaction with the measurement circuit(s) 147; in which one or more connected devices are powered by the keep-alive charging circuit(s) 145; etc. The timing, order, settings, and/or other characteristics of each stage of a testing protocol can be defined in any suitable manner and stored in any appropriate location that is accessible to the control interface processor 120. In some embodiments, the control processor includes an interface port 175 to provide connectivity with one or more external control systems 170. The interface port 175 can be implemented identically to the first port(s) 110a or second port(s) 110b, or can be implemented as any suitable wired or wireless port. For example, the interface port 175 can directly couple with an external control systems 170 via a captive cable, via a removable cable, via a wireless connection, via one or more communications networks, etc. The external control system(s) 170 can be implemented as a dedicated control device (e.g., programming hardware designed specifically to interface with the communications switch system 105), as a general purpose computer programmed to interface with the communications switch system 105, or in any other suitable manner. For example, a computational device can be programmed as the external control system 170 with a programming user interface that uses application programming interface instructions to define settings of testing protocols. Those defined protocols can be loaded from the external control system 170 to storage of the communications switch system 105 accessible to the control interface processor 120, or those defined protocols can be executed by the control interface processor 120 in conjunction with the external control system 170 (e.g., the external control system 170 can issue instructions to the control interface processor 120 via the interface port 175, in response to which the control interface processor 120 can direct corresponding functions of components of the communications switch system 105).

Returning to FIGS. 2A and 2B, the illustrative implementation of the communications switch system 200 includes illustrative implementations of various components described above. An interface port 175 is shown as a USB Type C port coupled with the control interface processor 120. In the particular implementation, a USB power delivery component is coupled with a portion of the interface port 175, and the high-speed data lines of the interface port 175 are coupled with the control interface processor 120. The illustrated control interface processor 120 is also coupled with a measurement circuit 147 that includes circuits to measure voltage and current on the Vbus and CC lines associated with the first port 110a, and a circuit to measure voltage on the Vbus lines associated with the second ports 110b. The control interface processor 120 is further coupled with voltage pattern recording of the CC lines associated with the first port 110a. The illustrated control interface processor 120 is also coupled with keep-alive charging circuits 145 on either side of the flip controller 130 to provide keep-alive charging for devices interfacing with any of the first port 110a or the second ports 110b. The illustrated control interface processor 120 is also coupled with a signal processor 140 to process signals of the high-speed and super-speed data channels associated with the first port 110a. Some embodiments include additional components, such as indicators (e.g., LEDs) 205, power systems (not shown), internal memories (not shown), etc.

Figure 3:
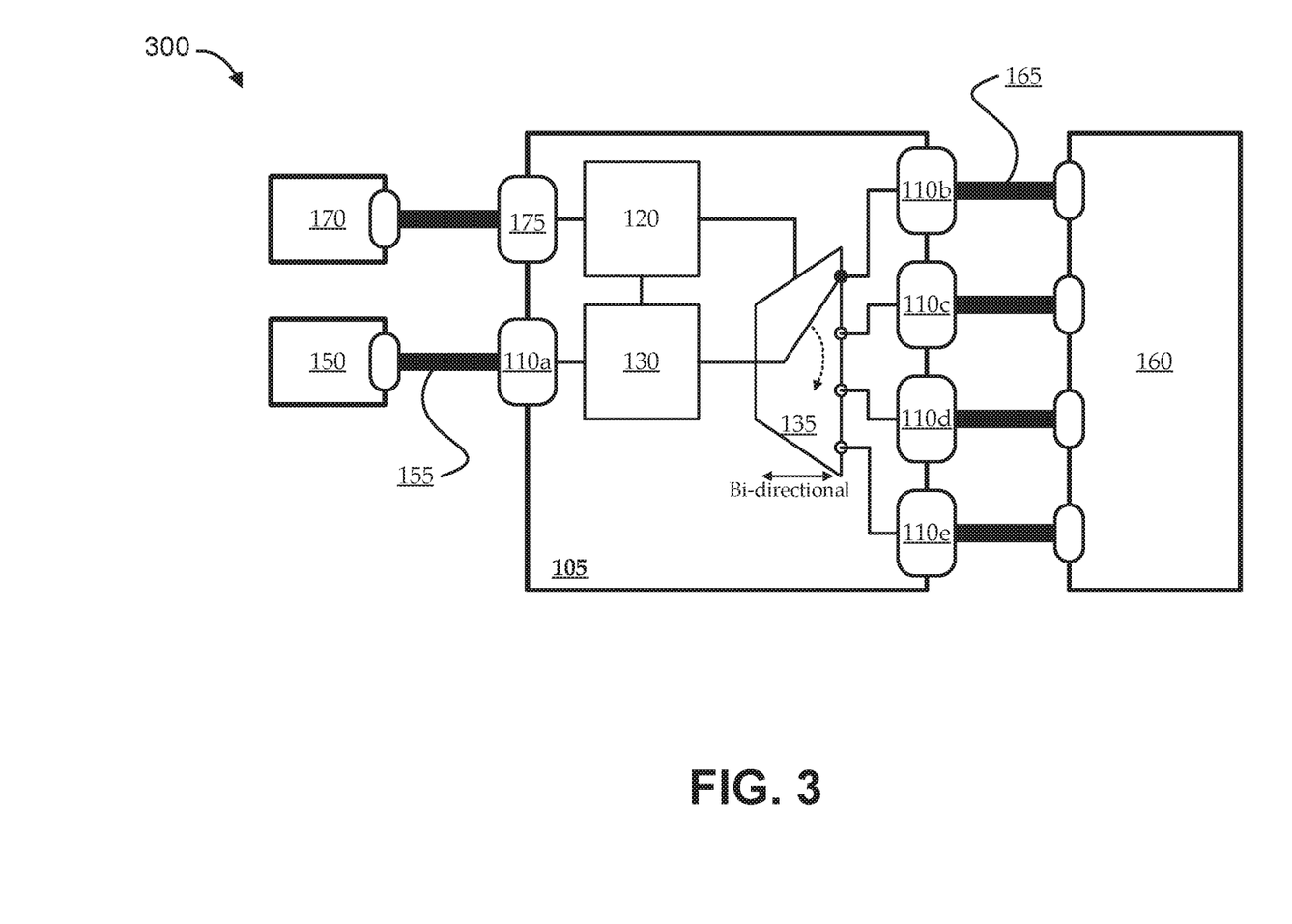
FIG. 3 shows a first testing configuration having an illustrative communications switch system coupled between a reference device and multiple ports of a device under test.

FIGS. 3-5 show example configurations for using embodiments of the communications switch systems, like those of FIGS. 1, 2A, and 2B. FIG. 3 shows a first testing configuration 300 having an illustrative communications switch system 105 coupled between a reference device 150 and multiple ports of a device under test 160. The communications switch system 105 is illustrated as a simplified block diagram having a control interface processor 120, a flip controller 130, and a select controller 135. The control interface processor 120 is also shown as coupled with an external control system 170 via an interface port.

The communications switch system 105 is coupled with the reference device 150 via a first multi-orientation port 110a and a reference-side cable 155. In one implementation, the reference device 150 is a device implemented according to a power delivery specification, such as any device that operates as a power source (e.g., a USB charger), a power sink (e.g., a smart phone being charged via USB), a power source and sink device, and/or a power analyzer. In another implementation, the reference device 150 is a device that operates as a load, such as a peripheral storage device (e.g., a USB thumb drive, an external hard disk drive, etc.), a powered external electronic device (e.g., a USB-powered flashlight, fan, etc.), or a specially designed load (e.g., a load designed to test a 100-Watt or other power specification, etc.). In another implementation, the reference device 150 is a throughput device that operates to deliver signals or traffic, such as a USB traffic or noise generator. In another implementation, the reference device 150 is a testing hardware or software device, such as an oscilloscope. The reference-side cable 155 can be implemented, as appropriate for the particular reference device 150. For example, where the reference device 150 is a USB memory stick, the reference-side cable 155 can be a captive cable, or the reference device 150 can be plugged directly into the first port 110a without a reference-side cable 155; and where the reference device 150 is a USB charger, the reference-side cable 155 can be a standard USB cable.

As shown, the communications switch system 105 is also coupled with multiple ports of a device under test 160 via respective multi-orientation ports 110b-110e and respective DUT-side cables 165. In one implementation, the device under test 160 is an active computational device, such as a laptop or desktop computer with multiple multi-orientation interfaces. In another implementation, the device under test 160 is a passive multi-port device, such as a multi-port hub, or the like. In some embodiments, each DUT-side cable 165 is implemented as a UOC. Using UOCs can effectively enable the flip controller 130 to emulate a change in orientation of the first port 110a, and have that change in orientation effectively pass through to the ports of the device under test 160 without being affected by the DUT-side cables 165.

The configuration of FIG. 3 can be used to execute a testing protocol emulating plugging the reference device 150 into each port of the device under test 160 in each of multiple permitted orientations without manual interaction by an operator. For example, at a first time, the flip controller 130 can be in a first flip mode, and the select controller 135 can be set to couple the first port 110a with a second port 110b; thereby effectively emulating the reference device 150 being plugged into a first port of the device under test 160 in a first orientation. At a second time, the flip controller 130 can be in a second flip mode, and the select controller 135 can continue to couple the first port 110a with a second port 110b; thereby effectively emulating the reference device 150 still being plugged into the first port of the device under test 160, but now in a second orientation (e.g., flipped over). At a third time, the flip controller 130 can be returned to the first flip mode, and the select controller 135 can now be set to couple the first port 110a with a third port 110c; thereby effectively emulating the reference device 150 being removed from the first port of the device under test 160 and plugged into a second port of the device under test 160 in the first orientation. The testing protocol can continue until all ports of the device under test 160 have been tested in each permitted orientation.

Figure 4:
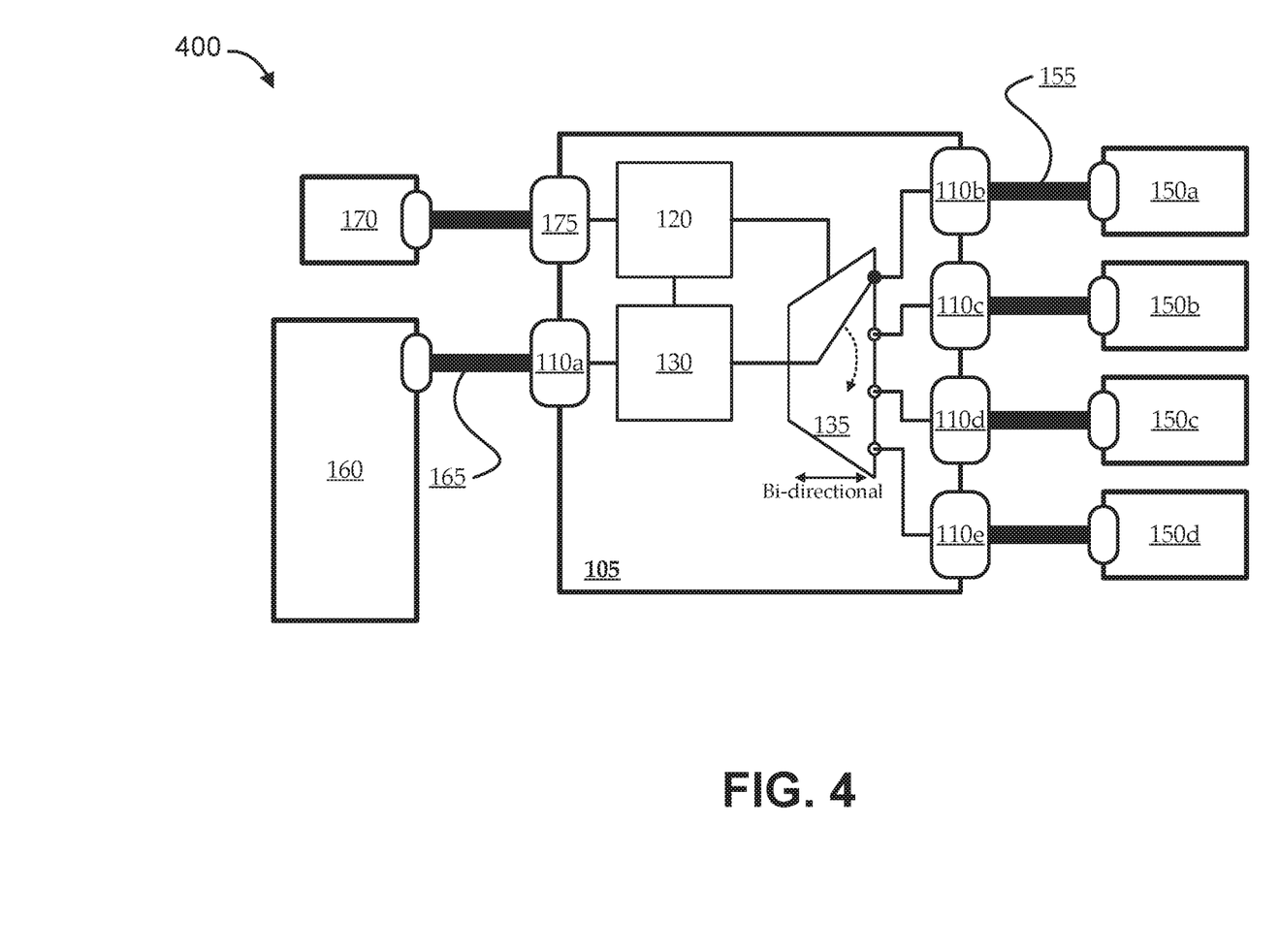
FIG. 4 shows a second testing configuration having an illustrative communications switch system coupled between a single port of a device under test and multiple reference devices.

FIG. 4 shows a second testing configuration 400 having an illustrative communications switch system 105 coupled between a single port of a device under test 160 and multiple reference devices 150. For the sake of simplicity, the communications switch system 105 is illustrated in substantially the same manner as in FIG. 3 and the same reference designators are used. As in FIG. 3, the device under test 160 can be an active or passive computational device, or any other suitable device having a multi-orientation port to be tested. Unlike in FIG. 3, only a single port of the device under test 160 is being tested in FIG. 4, and that port is coupled with the first port 110a of the communications switch system 105. Embodiments of this configuration 400 can use a UOC to couple the device under test 160 with the communications switch system 105. The communications switch system 105 is also coupled with four reference devices 150 via respective multi-orientation ports 110b-110e and respective reference-side cables 155 (where appropriate). In one implementation, a first reference device 150a is a power delivery sink device with a USB Type C superspeed connection interface, a second reference device 150b is a power delivery sink device with a USB Type C alternative mode connection interface, a third reference device 150c is a data device with a USB 2.0 high-speed connection interface, and a fourth reference device 150d is a human interface device with a USB 2.0 full-speed connection interface.

The configuration 400 can be used to execute a testing protocol emulating plugging each of the four reference devices 150 into the port of the device under test 160 in each of multiple permitted orientations without manual interaction by an operator. For example, at a first time, the flip controller 130 can be in a first flip mode, and the select controller 135 can be set to couple the first port 110a with the second port 110b; thereby effectively emulating the first reference device 150a being plugged into the device under test 160 in a first orientation. At a second time, the flip controller 130 can be in a second flip mode, and the select controller 135 can continue to couple the first port 110a with the second port 110b; thereby effectively emulating the reference device 150 still being plugged into the device under test 160, but now in a second orientation (e.g., flipped over). At a third time, the flip controller 130 can be returned to the first flip mode, and the select controller 135 can now be set to couple the first port 110a with the third port 110c; thereby effectively emulating the first reference device 150a being removed from the first port of the device under test 160 and, instead, the second reference device 150b being plugged into the device under test 160 in the first orientation. The testing protocol can continue until the device under test 160 has been tested with each reference device 150 in each permitted orientation.

Figure 5:
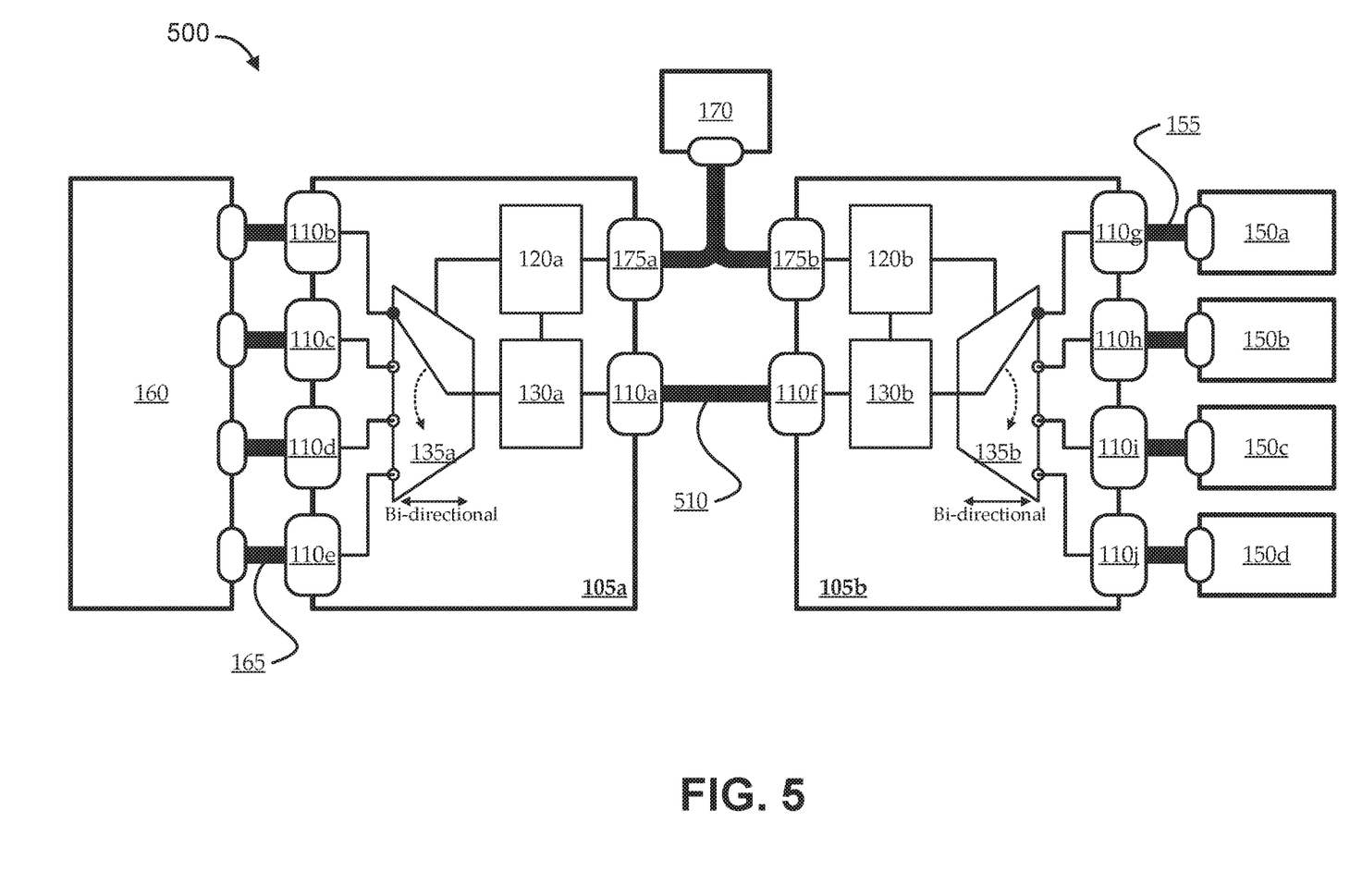
FIG. 5 shows a third testing configuration having two illustrative communications switch systems coupled between multiple reference devices and multiple ports of a device under test.

FIG. 5 shows a third testing configuration 500 having two illustrative communications switch systems 105 coupled between multiple reference devices 150 and multiple ports of a device under test 160. Though shown as two distinct communications switch systems 105, embodiments can be implemented using a single communications switch system 105. For example, a single communications switch system 105 can include multiple flip controllers 130, a single flip controller 130 implementing the functionality of multiple flip controllers 130, etc. As illustrated, a single external control system 170 is coupled with a first control interface processor 120a of the first communications switch system 105a via a first interface port 175a, and with a second control interface processor 120b of the second communications switch system 105b via a second interface port 175b. Alternatively, separate external control systems 170 can be used, and the external control systems 170 may or may not be in communication with each other. Further, as shown, a first multi-orientation port 110a of the first communications switch system 105a is coupled with a first multi-orientation port 110f of the second communications switch system 105b via an intermediary cable 510. In some implementations, the intermediary cable 510 is a standard cable, such as a standard USB cable.

As in FIG. 3, the first communications switch system 105a is coupled with multiple ports of a device under test 160 via respective multi-orientation ports 110b-110e and respective DUT-side cables 165. Multi-orientation ports 110b-110e can be selectively coupled with the first multi-orientation port 110a of the first communications switch system 105a via a first select controller 135a, and the orientation of port 110a as seen by ports 110b-110e can be determined by a first flip controller 130a. As in FIG. 4, the second communications switch system 105b is coupled with multiple reference devices 150 via respective multi-orientation ports 110g-110j and respective reference-side cable 155, where appropriate. Multi-orientation ports 110g-110j can be selectively coupled with multi-orientation port 110f via a second select controller 135b, and the orientation of port 110f as seen by ports 110g-110j can be determined by a second flip controller 130b. Depending on the testing protocol, the DUT-side cables 165 and/or reference-side cables 155 can be implemented as standard cables or as UOCs. The configuration 500 can be used to execute a testing protocol emulating plugging each of multiple reference devices 150 into each of multiple ports of a device under test 160 in each of multiple permitted orientations without manual interaction by an operator.

Figure 6A:
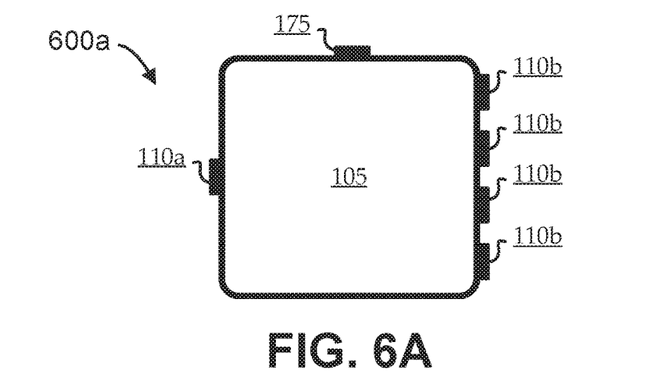
FIGS. 6A-6C show additional illustrative implementations of communications switch systems, according to various embodiments.
Figure 6B:
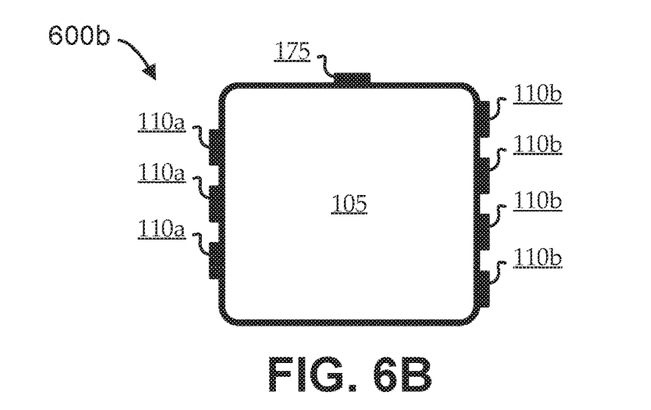
Figure 6C:
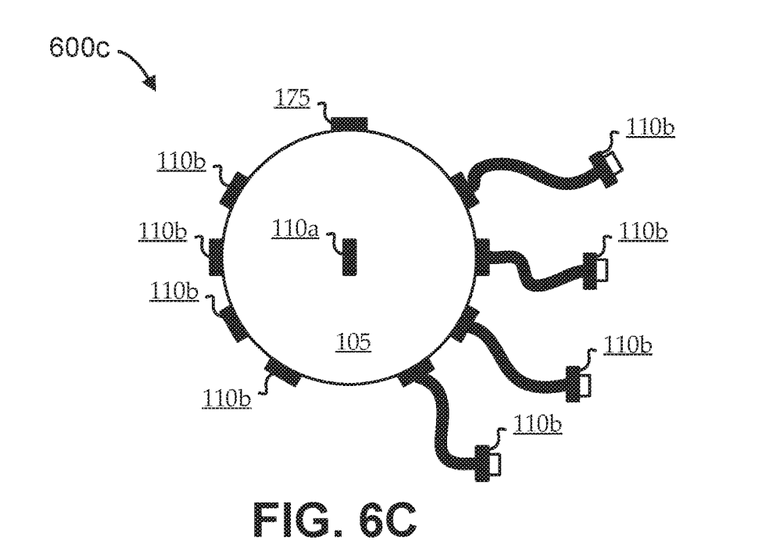

The embodiments illustrated in FIGS. 1-5 are intended to illustrate only some of the possible implementations of the communications switch system 105. FIGS. 6A-6C show additional illustrative implementations of communications switch systems 600, according to various embodiments. FIG. 6A shows an example of a 1:N configuration of communications switch system 600a having a substantially rectangular chassis form factor. The "1:N" designates that there is a single first port 110a (e.g., shown disposed on one side of the system 600a) and N second ports 110b (e.g., four are shown disposed on the opposite side of the system 600a). As described above, any of the four second ports 110b can be selectively coupled with the first port 110a, and the orientation emulated across the coupling can be adjusted (e.g., flipped), all without manual intervention. The system 600a can also include an interface port 175 (shown disposed on a third side of the system 600a).

FIG. 6B shows an example of a M:N configuration of communications switch system 600b having a substantially rectangular chassis form factor. The "M:N" designates that there are M first ports 110a (e.g., three are shown disposed on one side of the system 600b) and N second ports 110b (e.g., four are shown disposed on the opposite side of the system 600b). As described above, any of the four second ports 110b can be selectively coupled with any of the three first ports 110a, and the orientation emulated across any of the couplings can be adjusted (e.g., flipped), all without manual intervention. The system 600b can also include an interface port 175 (shown disposed on a third side of the system 600b).

FIG. 6C shows an example of a 1:N configuration of communications switch system 600c having a substantially circular chassis form factor. One first port 110a is shown disposed on a top face of the system 600c. Four of a first type of second port 110b (e.g., female receptacles) are shown disposed around the circumference of the system 600c to one side of the first port 110a; and four of a second type of second port 110b (e.g., captive cables ending in male plugs) are shown disposed around the circumference of the system 600c to the opposite side of the first port 110a. As in FIG. 6A, any of the second ports 110b can be selectively coupled with the first port 110a, and the orientation emulated across any of the couplings can be adjusted (e.g., flipped), all without manual intervention. The system 600b can also include an interface port 175. Other embodiments can include any other suitable form factors, numbers and configurations of cables, etc.

Figure 7:
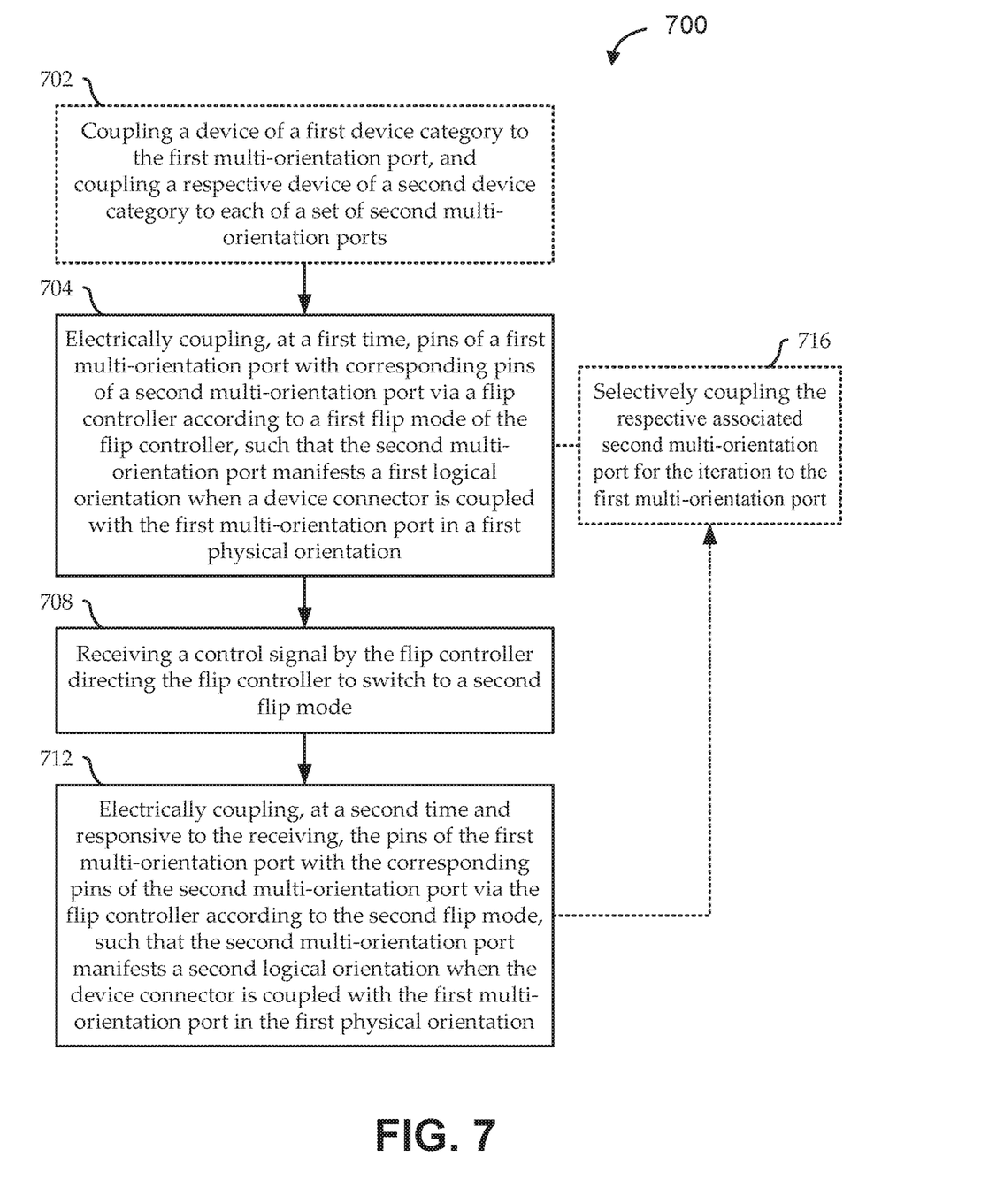
FIG. 7 shows a flow diagram of an illustrative method for testing multi-orientation connector system components using a communications switch system, according to various embodiments.

FIG. 7 shows a flow diagram of an illustrative method 700 for testing multi-orientation connector system components using a communications switch system, according to various embodiments. Embodiments of the method 700 can be implemented using any of the systems described above with reference to FIGS. 1-6C, and/or any other suitable system. Embodiments begin at stage 704 by electrically coupling, at a first time, each of multiple pins of a first multi-orientation port with each of corresponding multiple pins of a second multi-orientation port via a flip controller according to a first flip mode of the flip controller. For example, the flip controller can operate in multiple modes that can be automatically selected, toggled, etc. In the first flip mode, the second multi-orientation port manifests a first logical orientation when a device connector is coupled with the first multi-orientation port in a first physical orientation.

At stage 708, embodiments can receive a control signal by the flip controller directing the flip controller to switch to a second flip mode. For example, the signal can be generated by a control interface processor, an external control system, or in any suitable manner. At stage 712, at a second time and responsive to the receiving in stage 708, embodiments can second electrically couple each of the pins of the first multi-orientation port with each of the corresponding pins of the second multi-orientation port via the flip controller according to the second flip mode. In the second flip mode, the second multi-orientation port manifests a second logical orientation when the device connector is coupled with the first multi-orientation port in the first physical orientation. For example, if a first device is plugged into the first port, and a second device is plugged into the second port; switching from the first flip mode to the second flip mode can appear to the second device as if a connector of the first device was unplugged from the first port, flipped over, and plugged back into the first port.

In some embodiments, at stage 702 (e.g., prior to the first electrical coupling in stage 704), a device of a first device category can be coupled to the first multi-orientation port, and a device of a second device category can be coupled to the second multi-orientation port. In some such embodiments, the second multi-orientation port is one of multiple second multi-orientation ports, and a respective device of the second device category can be coupled to each second multi-orientation port. Such embodiments can iteratively perform the first electrically coupling of stage 704, the receiving of stage 708, and the second electrically coupling of stage 712 for each second multi-orientation port (e.g., each iteration corresponds to a respective associated multi-orientation port). As part of each iteration, at stage 716, the respective associated second multi-orientation port can be selected for coupling with the first multi-orientation port. In some implementations, stage 716 is part of stage 704: In each iteration, the first electrically coupling at stage 704 includes coupling the plurality of pins of the first multi-orientation port with each of the corresponding plurality of pins of the respective associated second multi-orientation port.

In some embodiments, the first device category is a port of a device under test, and the second device category is a reference device. For example, as described with reference to FIG. 4, the method 700 can be used to automatically emulate iteratively plugging each of multiple reference devices into a single port of a device under test in each of multiple permitted orientations. In other embodiments, the first device category is a reference device, and the second device category is a port of a device under test. For example, as described with reference to FIG. 3, the method 700 can be used to automatically emulate iteratively plugging a single reference device into each of multiple ports of a device under test in each of multiple permitted orientations.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable devices, or the like, to facilitate the transfer of means for performing the methods described herein. Alternatively, various methods described herein can be provided via storage means (e.g., RAM, ROM, a physical storage medium such as a CD or floppy disk, etc.) to devices. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A multi-port communications switch comprising:
a first port and a second port, each port having a plurality of pins adapted to electrically couple with corresponding structures of a data connector when the connector is physically coupled with the port in any of a plurality of connector orientations;
a control interface processor having a flip control output to indicate a selected one of a plurality of flip modes; and
a flip controller coupled with the control interface processor, having a plurality of first-side connections coupled with the plurality of pins of the first port, and having a plurality of second-side connections coupled with the plurality of pins of the second port, such that:
in response to the flip control output indicating a first flip mode, the flip controller couples the first-side connections with the second-side connections to emulate the first port and the second port being oriented according to a same one of the connector orientations; and in response to the flip control output indicating a second flip mode, the flip controller couples the first-side connections with the second-side connections to emulate the first port and the second port being oriented according to different ones of the connector orientations.

2. The multi-port communications switch of claim 1, wherein the plurality of pins of each port is rotationally symmetric.

3. The multi-port communications switch of claim 1, wherein each port has the plurality of pins adapted to electrically couple with corresponding structures of a Universal Serial Bus (USB) Type C connector.

4. The multi-port communications switch of claim 1, wherein:
   the plurality of pins of each port comprises: a first control channel (CC1) pin, a second control panel (CC2) pin, a first data channel transmit positive (Tx1+) pin, a first data channel receive positive (Rx1+) pin, a second data channel transmit positive (Tx2+) pin, a second data channel receive positive (Rx2+) pin, a first data channel transmit negative (Tx1−) pin, a first data channel receive negative (Rx1−) pin, a second data channel transmit negative (Tx2−) pin, a second data channel receive negative (Rx2−) pin, a first sideband unit (SBU1) pin, and a second sideband unit (SBU2) pin;
   in response to the flip control output indicating the first flip mode, the flip controller couples the CC1 pin, the CC2 pin, the Tx1+ pin, the Rx1+ pin, the Tx2+ pin, the Rx2+ pin, the Tx1− pin, the Rx1− pin, the Tx2− pin, the Rx2− pin, the SBU1 pin, and the SBU2 pin of the first port to the CC1 pin, the CC2 pin, the Rx1+ pin, the Tx1+ pin, the Rx2+ pin, the Tx2+ pin, the Rx1− pin, the Tx1− pin, the Rx2− pin, the Tx2− pin, the SBU2 pin, and the SBU1 pin of the second port, respectively; and
   in response to the flip control output indicating the second flip mode, the flip controller couples the CC1 pin, the CC2 pin, the Tx1+ pin, the Rx1+ pin, the Tx2+ pin, the Rx2+ pin, the Tx1− pin, the Rx1− pin, the Tx2− pin, the Rx2− pin, the SBU1 pin, and the SBU2 pin of the first port to the CC2 pin, the CC1 pin, the Rx2+ pin, the Tx2+ pin, the Rx1+ pin, the Tx1+ pin, the Rx2− pin, the Tx2− pin, the Rx1− pin, the Tx1− pin, the SBU1 pin, and the SBU2 pin of the second port, respectively.

5. The multi-port communications switch of claim 1, wherein the second port is one of N second ports, N being a positive integer greater than 1, and further comprising:
   a select controller having:
      a plurality of flip-side connections coupled with the plurality of second-side connections of the flip controller;
      N sets of port-side connections, each set of port-side connections coupled with the plurality of pins of a respective one of the N second ports; and
      a selector circuit to selectively couple the plurality of flip-side connections to any selected one of the sets of port-side connections.

6. The multi-port communications switch of claim 5, wherein the select controller further comprises:
   a plurality of selective actuators, each coupled between a respective one of the flip-side connections and a respective one of the port-side connections, each to selectively interrupt signal flow between the respective flip-side connection and the respective port-side connection automatically in response to signaling received from the control interface processor.

7. The multi-port communications switch of claim 5, wherein the select controller is a first select controller, the first port is one of M first ports, M being a positive integer greater than 1, and further comprising:
   a second select controller having:
      a second plurality of flip-side connections coupled with the plurality of first-side connections of the flip controller;
      M second sets of port-side connections, each second set of port-side connections coupled with the plurality of pins of a respective one of the M first ports; and
      a second selector circuit to selectively couple the second plurality of flip-side connections to any selected one of the second sets of port-side connections.

8. The multi-port communications switch of claim 5, wherein the plurality of pins of each of the second ports comprises a power pin, and further comprising:
   a keep-alive charging circuit coupled with the power pins to source power to a device coupled with a non-selected one of the second ports via the respective power pin of the non-selected one of the second ports.

9. The multi-port communications switch of claim 1, further comprising:
   an interface port coupled with the control interface processor to receive control commands from an external computational system, the flip control output being responsive to the control commands.

10. The multi-port communications switch of claim 1, further comprising a captive cable terminating in one of the first port or the second port.

11. The multi-port communications switch of claim 1, wherein at least one of the first port or the second port comprises a female receptacle having the respective plurality of pins disposed therein.

12. The multi-port communications switch of claim 1, further comprising:
   a chassis having, housed therein, the first port, the second port, the control interface processor, and the flip controller.

13. The multi-port communications switch of claim 1, further comprising:
   a signal processor circuit coupled between data channel pins of the plurality of pins of the first port and corresponding ones of the first-side connections to adjustably apply gain to data signals communicated via the data channel pins.

14. The multi-port communications switch of claim 1, further comprising:
   a signal processor circuit coupled between data channel pins of the plurality of pins of the first port and corresponding ones of the first-side connections to apply signal processing to data signals communicated via the data channel pins.

15. The multi-port communications switch of claim 1, further comprising:
   a measurement circuit in electrical communication with at least some of the plurality of pins of at least one of the ports to measure electrical characteristics of signals communicated via the at least some of the plurality of pins.

16. A kit comprising the multi-port communications switch of claim 1, and further comprising:
   a universal orientation cable adapted to physically and electrically interface with at least some of the plurality of pins of at least one of the first port or the second port without electrically or physically defining its orientation.

17. A method for testing multi-orientation connector system components using a communications switch system, the method comprising:
first electrically coupling, at a first time, each of a plurality of pins of a first multi-orientation port with each of a corresponding plurality of pins of a second multi-orientation port via a flip controller according to a first of a plurality of flip modes of the flip controller, such that the second multi-orientation port manifests a first logical orientation when a device connector is coupled with the first multi-orientation port in a first physical orientation;
receiving a control signal by the flip controller directing the flip controller to switch to a second of the plurality of flip modes; and
second electrically coupling, at a second time and responsive to the receiving, each of the plurality of pins of the first multi-orientation port with each of the corresponding plurality of pins of the second multi-orientation port via the flip controller according to the second flip mode, such that the second multi-orientation port manifests a second logical orientation when the device connector is coupled with the first multi-orientation port in the first physical orientation.

18. The method of claim 17, wherein the second multi-orientation port is one of a set of second multi-orientation ports, and further comprising:
coupling a device of a first device category to the first multi-orientation port;
coupling a respective device of a second device category to each second multi-orientation port; and
iteratively performing the first electrically coupling, the receiving, and the second electrically coupling for each second multi-orientation port, such that each iteration corresponds to a respective associated multi-orientation port,
wherein, in each iteration, the first electrically coupling comprises coupling the plurality of pins of the first multi-orientation port with each of the corresponding plurality of pins of the respective associated second multi-orientation port.

19. The method of claim 18, wherein the first device category is a device under test, and the second device category is a reference device.

20. The method of claim 18, wherein the first device category is a reference device, and the second device category is a device under test.

* * * * *